United States Patent [19]

Hasegawa

[11] Patent Number: 5,131,754
[45] Date of Patent: Jul. 21, 1992

[54] METHOD OF AND DEVICE FOR DETECTING POSITION OF BODY

[75] Inventor: Akira Hasegawa, Takasago, Japan

[73] Assignee: Kabushiki Kaisha Kobe Seiko Sho, Kobe, Japan

[21] Appl. No.: 401,806

[22] Filed: Sep. 1, 1989

[51] Int. Cl.⁵ ............................................. G01B 11/14
[52] U.S. Cl. .................................... 356/375; 356/372
[58] Field of Search ............... 356/375, 376, 372, 23, 356/385, 4; 364/513, 191; 250/560, 561; 152/1, 4, 5

[56] References Cited

U.S. PATENT DOCUMENTS

| | | | |
|---|---|---|---|
| 4,063,820 | 12/1977 | Borgese. | |
| 4,486,776 | 12/1984 | Yoshida | 356/23 |
| 4,509,265 | 4/1985 | Donaldson | 356/376 |
| 4,639,878 | 1/1987 | Day et al. | |
| 4,662,752 | 5/1987 | Tucker et al. | 356/375 |
| 4,682,894 | 7/1987 | Schmidt et al. | 356/375 |
| 4,925,308 | 5/1990 | Stern et al. | 356/375 |

FOREIGN PATENT DOCUMENTS

| | | | |
|---|---|---|---|
| 3526919 | 1/1986 | Fed. Rep. of Germany. | |
| 0292003 | 12/1986 | Japan | 356/375 |
| 0291508 | 12/1987 | Japan | 356/375 |
| 0133002 | 6/1988 | Japan | 356/375 |

Primary Examiner—Richard A. Rosenberger
Assistant Examiner—Hoa Pham
Attorney, Agent, or Firm—Oblon, Spivak, McClelland, Maier & Neustadt

[57] ABSTRACT

A method of and a device for detecting a position of a body by without the necessity of a special detector or a very complicated calculating processing. According to the method, a position of a body is detected by measuring spatial coordinates of three, two and one points on faces of the body which are included in three mutually intersecting planes. The positions detecting device includes a switch for detecting a predetermined position of a moving body in a first direction, and first and second distance measuring devices which operate, in response to the switch, individually at two different timings to measure distances from known points in directions oblique to the first direction and to each other to three and two points on different oblique faces of the body, respectively. A processor calculates a position of the body in accordance with results and timings of the measurements by the first and second distance measuring devices and predetermined data defining the configuration of the body.

3 Claims, 7 Drawing Sheets

METHOD OF AND DEVICE FOR DETECTING POSITION OF BODY

BACKGROUND OF THE INVENTION

1. Field of the Invention

This invention relates to a method of, and a device for, detecting a position of a body, and more particularly to a method and a device by which a position of a body can be detected without the necessity of a special sensor or a special calculating process.

2. Description of the Prior Art

When a body or work is to be worked by a teaching playback robot, normally the position of the work upon playback is different from that upon teaching.

Therefore, it is necessary to calculate a displacement between the position of the work upon playback and the position of the work upon teaching and correct teaching data with the displacement. To this end, it is necessary to detect the position of the work upon playback.

According to an exemplary one of known detecting methods, an end of a robot is moved until it is electrically connected to one of a plurality of reference points provided on a work, and a position of the work is calculated from coordinate data of the robot at that point of time. Such method is disclosed, for example, in Japanese Patent Laid-Open No. 61-95779.

According to another exemplary known detecting method, a work is picked up by a television camera, and a position of the work is calculated by executing a calculating processing of image data obtained by the television camera.

The conventional methods, however, are disadvantageous in that they require a special detector or a very complicated calculating processing, which makes the construction of a detecting device complicated.

SUMMARY OF THE INVENTION

It is an object of the present invention to provide a method and a device by which a position of a body can be detected without the necessity of a special detector or a very complicated calculating processing.

In order to attain the above-noted object, according to one aspect of the present invention, there is provided a method of detecting a position of a body including the step of measuring, where a body is in a space defined by coordinate axes X, Y and Z and has a face F intersecting the direction of the X axis, another face G intersecting the direction of the Y axis and a further face H intersecting the direction of the Z axis, spatial coordinates of three points $f_1$, $f_2$ and $f_3$ on the F face, spatial coordinates of two points $g_1$ and $g_2$ on the G face and spatial coordinates of a point $h_1$ on the H face to detect the position of the body.

According to another aspect of the present invention, there is provided a device for detecting a position of a moving body, which comprises a Z position detecting switch means for detecting when a body moves and then delivering a trigger signal. In a space defined by rectangular coordinate axes X, Y and Z, in a direction of the Z axis, an X distance measuring means for measuring, after lapse of a predetermined interval of time after delivery of the trigger signal from the Z position detecting switch means, distances in a direction of the X axis from known points to two points $f_1$ and $f_2$ on a face F of the body intersecting the direction of the X axis and for measuring, after lapse of another predetermined interval of time thereafter, a distance in the direction of the X axis from one of the known points to another point $f_3$ on the face F, a Y distance measuring means for measuring, after lapse of a predetermined interval of time after delivery of the trigger signal from the Z position detecting switch means, a distance in a direction of the Y axis from a known point to a point $g_1$ on a face G of the body intersecting the direction of the Y axis and for measuring after lapse of another predetermined interval of time thereafter, a distance in the direction of the Y axis from the known point to another point $g_2$ on the face G, and a calculating means for calculating a position of the body in accordance with results and timings of the measurements by the X and Y distance measuring means and data defining the configuration of the body.

The coordinate axes X, Y and Z may be axes of a rectangular coordinate system or of an oblique coordinate system.

Meanwhile, depending upon a configuration of a body for detection, some of the points $f_1$ to $h_1$ may be omitted, or otherwise, points for such measurement may be increased in order to improve the reliability in measurement.

Further, the faces F, G and H of the body may be actually flat faces or may be imaginary flat faces obtainable from actually curved faces.

Thus, with the method and device of the present invention, three planes which exist actually or imaginarily in accordance with a position of a body are defined. Consequently, a position of the body can be determined decisively.

Accordingly, a position of a body in a space can be detected without the necessity of employment of a special detector or a special calculating processing.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENTS

Figure 1:
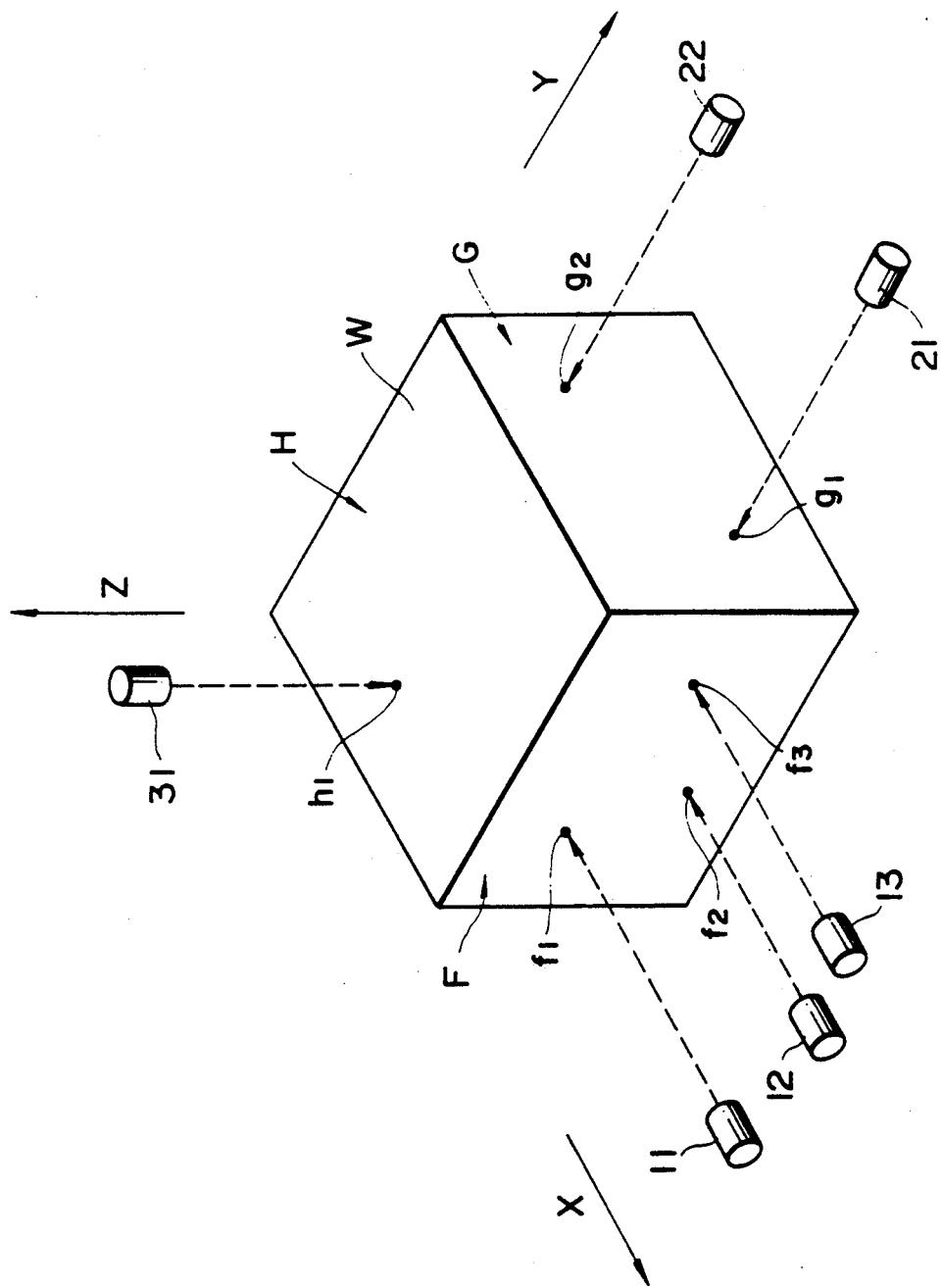
FIG. 1 is a schematic perspective view showing an arrangement of detectors according to the present invention.

Referring now to the drawings, wherein like reference numerals designate identical or corresponding parts throughout the several views, and more particularly to FIG. 1 thereof, a position of a body or work W is detected using a plurality of detectors. In particular, the work W in the form of a parallelepiped is placed in a space which is defined by rectangular coordinate axes X, Y and Z.

A plane which includes a front face F of the parallelepiped W is decisively determined if spatial coordinates of three points $f_1$, $f_2$ and $f_3$ on the plane are known.

Thus, if distances to the front face F in the direction of the X axis are measured by means of, for example, three ultrasonic or optical distance sensors 11, 12 and 13 placed at known points in the space, then the individual spatial coordinates of the three points $f_1$, $f_2$ and $f_3$ can be obtained by parallel translation of spatial coordinate values of the distance sensors 11, 12 and 13, respectively, in the direction of the X axis. The plane including the front face F can thus be defined by the spatial coordinates thus obtained.

However, the positions of the parallelepiped W in its rotational direction around an axis perpendicular to the plane and in a plane including the axis are still unknown.

Subsequently, spatial coordinates of two points $g_1$ and $g_2$ on a side face G of the parallelepiped W can be obtained in a similar manner by means of two distance sensors 21 and 22 placed at individually known points. In short, the spatial coordinates of the points $g_1$ and $g_2$ can be obtained by parallel translation of space coordinates of the distance sensors 21 and 22, respectively, in the direction of the Y axis in accordance with results of measurements by the distance sensors 21 and 22.

Since here the front face F and the side face G extend perpendicularly to each other, if the space coordinates of the two points $g_1$ and $g_2$ are known, then the plane including the side face G can be defined from them. Accordingly, the rotational position of the parallelepiped W around the axis perpendicular to the plane including the front face F (accordingly, an inclination of the front face F and the side face G of the parallelepiped W) can be defined.

However, the position of the parallelepiped W on a line along which the plane including the front face F and the plane including the side face G cross each other still remains unknown.

Then, spatial coordinates of a point $h_1$ on an upper face H of the parallelepiped W can be obtained by means of a distance sensor 31 located at a known point. The spatial coordinates of the point $h_1$ can be obtained similarly by parallel translation of spatial coordinates of the known point of the distance sensor 31 in a direction of the Z axis in accordance with a result of the measurement by the distance sensor 31.

Since the upper face H extends perpendicularly to both of the front face F and the side face G, if the spatial coordinates of the point $h_1$ are known, then the plane including the upper face H can be defined. Consequently, the position of the parallelepiped W on the line along which the plane including the front face F and the plane inlcuding the side face G cross each other can be defined.

Accordingly, the position of the parallelepiped W in the space can be defined perfectly.

After all, if spatial coordinates of the three points $f_1$, $f_2$ and $f_3$ on the front face F, the two points $g_1$ and $g_2$ on the side face G and the one point $h_1$ on the upper face H are obtained, then the position of the parallelepiped W can be defined perfectly. Then, since measurements of the spatial coordinates of the individual points $f_1$ to $h_1$ can be made readily by means of such distance sensors as described above, no special detector is necessitated. Further, since a calculating processing after then only involves parallel translation and rotation of coordinates, the position of the parallelepiped W in the space can be calculated readily making use of a spatial coordinate conversion algorithm which is established already, and there is no need of developing a special calculating process.

Figure 2:
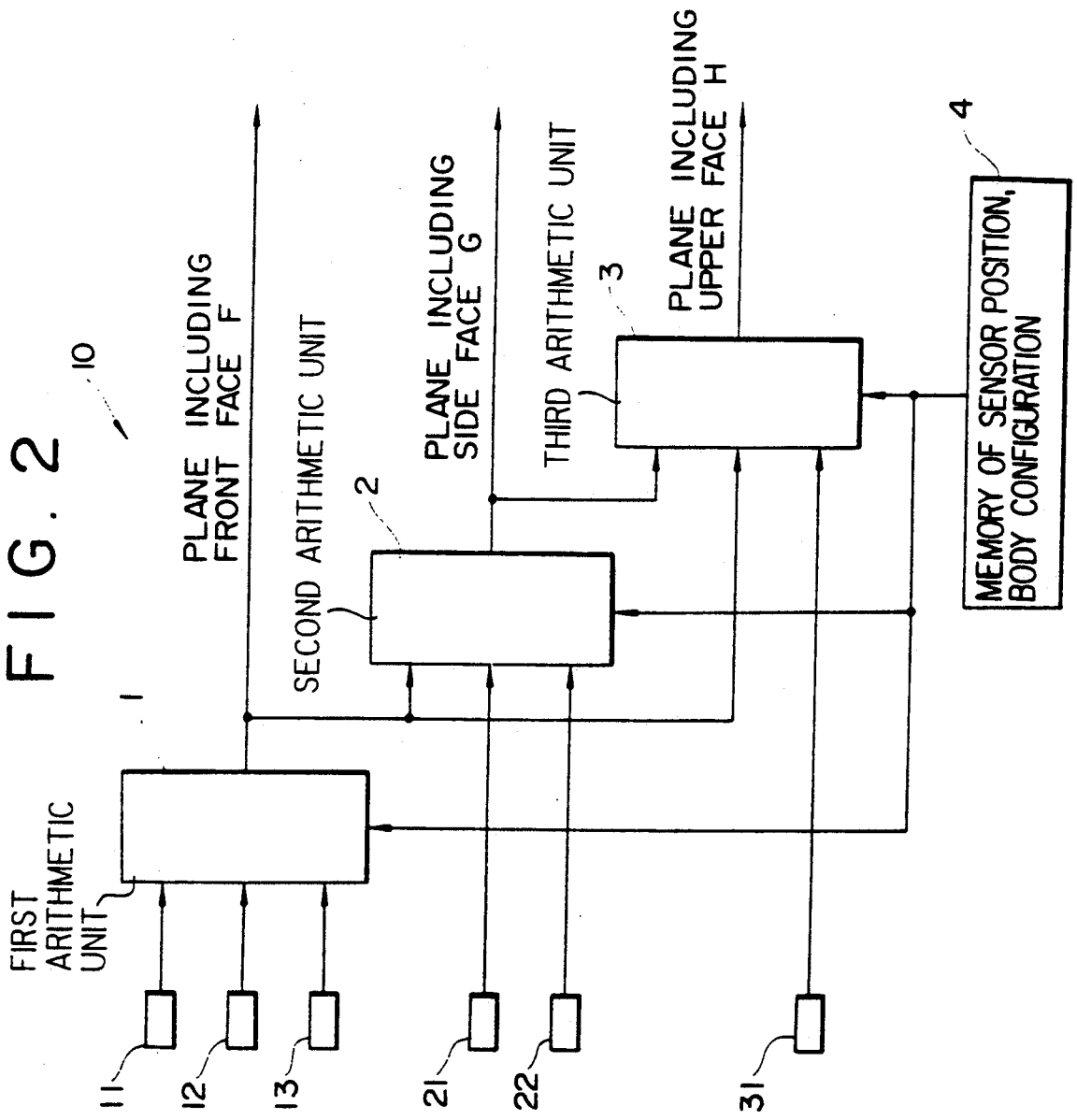
FIG. 2 is a block diagram of a position detecting device according to the present invention.

Referring now to FIG. 2, there is shown a device 10 for detecting a position of a body which includes such distance sensors 11 to 31 as shown in FIG. 1. The position detecting device 10 includes a first arithmetic unit 1 for calculating the plane including the front face F of the parallelepiped W, a second arithmetic unit 2 for calculating the plane including the side face G, and a third arithmetic unit 3 for calculating the plane including the upper face H. Then, spatial coordinates of an arbitrary location of the parallelepiped W can be calculated from data of the three planes and data of a configuration of the parallelepiped W. Data of locations of the distance sensors 11 to 31 and such configuration data of the parallelepiped W are stored in advance in a memory 4.

It is to be noted that, while description is given above of the parallelepiped W, the body is not limited to such real parallelepiped, and a position of any real body can be detected if a single imaginary parallelepiped can be determined from an actual configuration of the body. Meanwhile, the front face F, side face G and upper face H need not always extend perpendicularly to each other and may cross each other otherwise at oblique angles. Further, while such faces are represented hereinabove as the front face F, side face G and upper face H for convenience of description, they are not limited to such special representations. Therefore, such three faces will be hereinafter referred to simply as F face, G face and H face.

Figure 3:
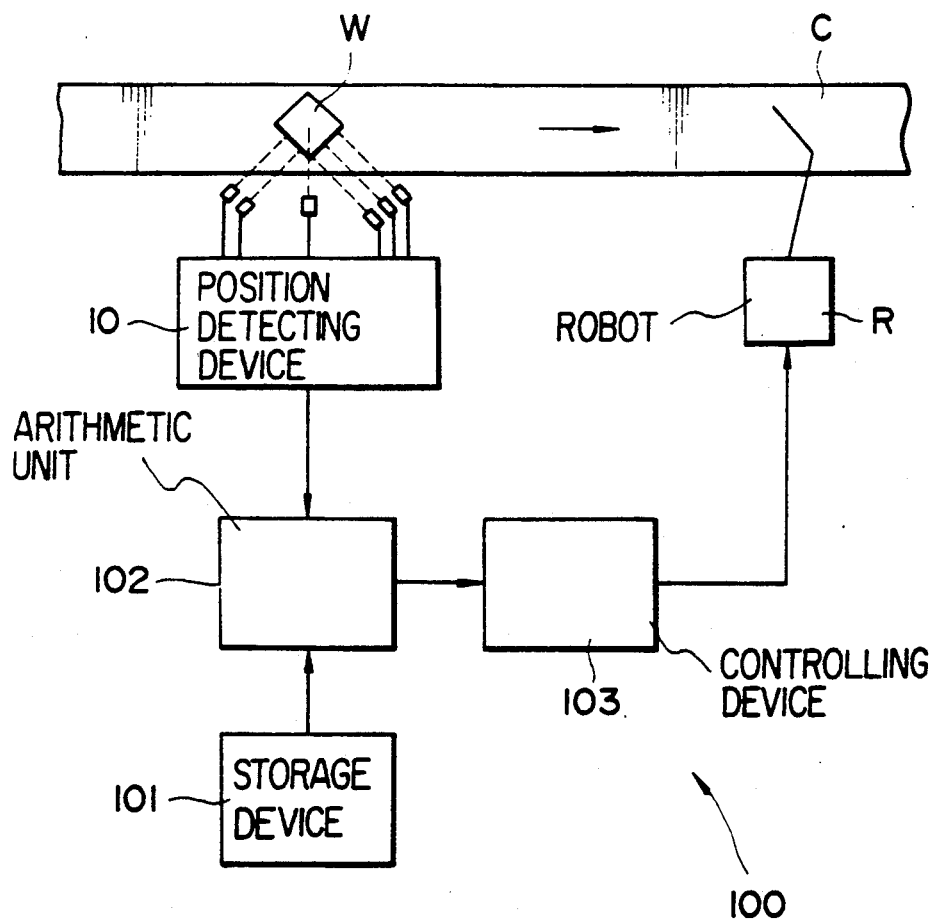
FIG. 3 is a block diagram of a robot system which includes the position detecting device shown in FIG. 2.

Referring now to FIG. 3, there is shown a robot system 100 in which the body position detecting device 10 described hereinabove is incorporated. In particular, a position of a work W is detected at an upper stream side location of a conveyor C by the body position detecting device 10. The position of the work W thus detected and a reference position corresponding to teaching data stored in a storage device 101 are compared with each other by an arithmetic unit 102 to correct the teaching data, and the thus corrected teaching data is transmitted to a robot controlling device 103. The robot controlling device 103 controls a robot R to operate in accordance with the corrected teaching data to work the work W in a predetermined manner.

Figure 4:
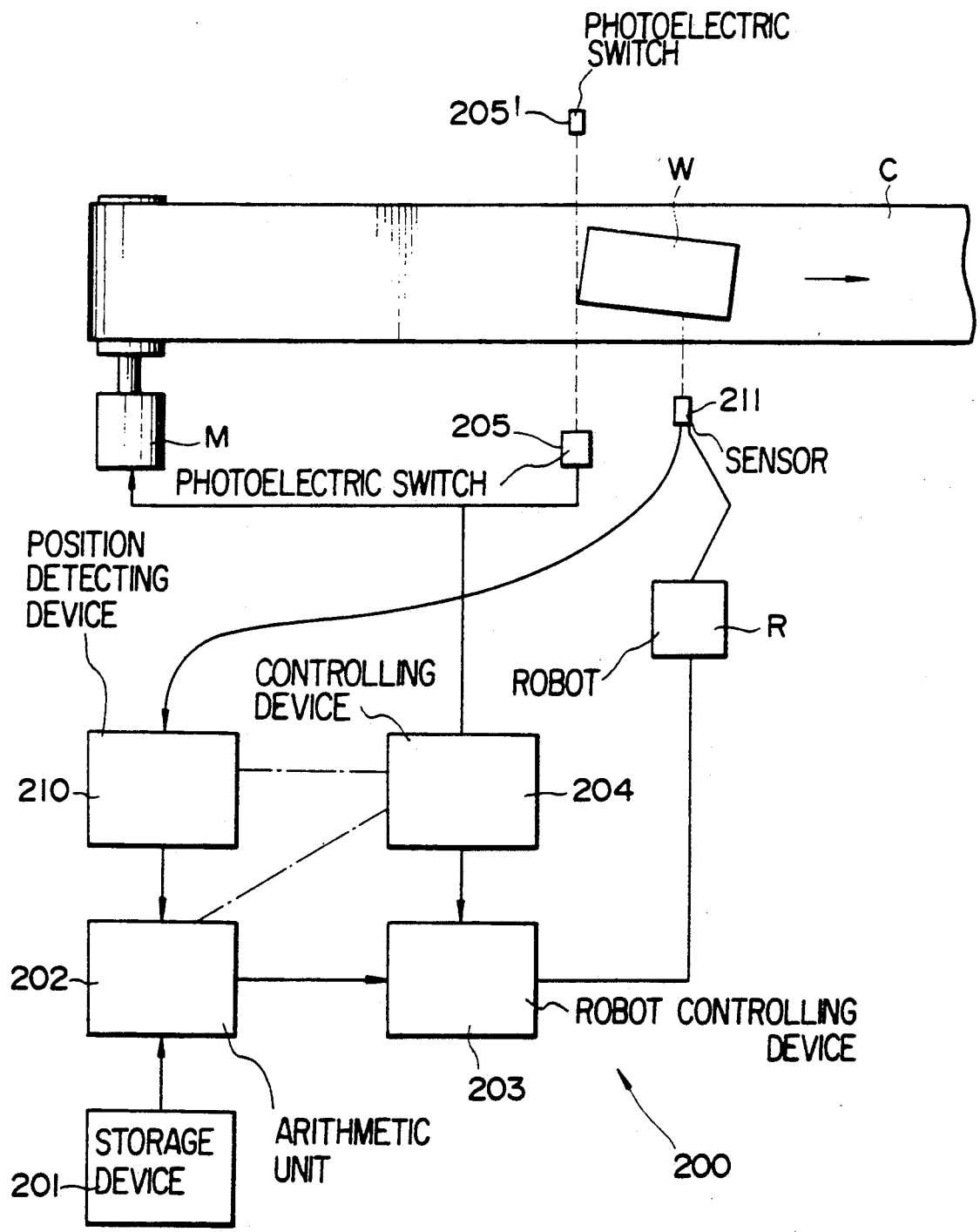
FIG. 4 is a schematic block diagram of a robot system which includes another position detecting device according to the present invention.

Referring now to FIG. 4, there is shown a robot system in which another position detecting device according to the present invention is incorporated. The position detecting device includes a single distance sensor 211 attached to an end of a robot R, and the robot R is moved in order to measure spatial coordinates of three points $f_1$, $f_2$ and $f_3$ on an F face, spatial coordinates of two points $g_1$ and $g_2$ on a G face and coordinates of a point $h_1$ on an H face by means of the single detector 211.

In particular, when a photoelectric switch 205 is turned on after it has been turned off once during transportation of a work W on a conveyor C, the photoelectric switch 205 develops a trigger signal to deenergize a motor M to stop the conveyor C. Meanwhile, a measurement controlling device 204 is rendered operative.

The measurement controlling device 204 controls a robot controlling device 203 to operate the robot R to successively move the distance sensor 211 to predetermined positions to measure spatial coordinates of such 6 points $f_1$ to $h_1$ as described hereinabove.

After the measurement of the spatial coordinates of the 6 points $f_1$ to $h_1$, a position detecting device 210 outputs an actual position of the work W.

Thus, the position of the work W thus detected and a reference position corresponding to teaching data stored in a storage device 201 are compared with each other by arithmetic unit 202 to correct the teaching data, and the thus corrected teaching data is transmitted to the robot controlling device 203. The robot controlling device 203 controls the robot R to operate in accordance with the corrected teaching data to work the work W in a predetermined manner.

Where the distance sensor 211 is moved by the robot R to make a predetermined measurement in this manner, only the single distance sensor 211 is required, and consequently, the position detecting device can be produced at a reduced cost. Further, since points for measurement and the number of such measurement points can be modified flexibly, the position detecting device can cope with various types of works. Besides, since a measuring operation is performed by a robot itself which makes a working operation, the error is minimized, and the reliability is improved.

Figure 5:
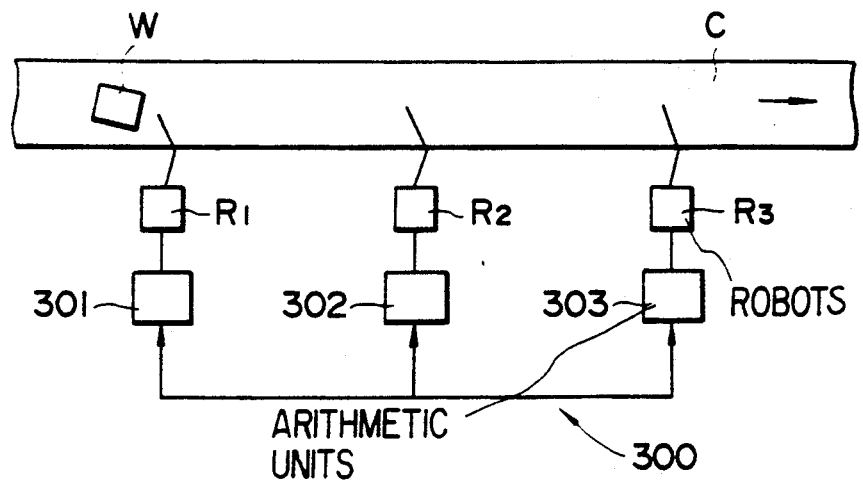
FIG. 5 is a block diagram illustrating a working system which includes a plurality of robots.

Referring now to FIG. 5, there is shown a robot system 300 wherein a work W transported by a conveyor C is worked successively by a plurality of, three in the arrangement shown, robots $R_1$, $R_2$ and $R_3$. In the robot system, a position of the work W is detected by the robot $R_1$ on the most upstream side in a similar manner as in the robot system 200 described hereinabove, and results of such detection are transmitted to the robots $R_2$ and $R_3$ on the downstream side in order to achieve correction of position data efficiently. Arithmetic units 301, 302, 302 process the results of detection to product position data for each of respective robots.

FIGS. 6(a), 6(b), 7(a), 7(b) and 8 show a system for detecting a position of an automobile body transported by an overhead conveyor. Correction is thus made for displacement of the position of the work in accordance with a result of such position detection, and coating and welding are carried out by a robot with the thus corrected data.

Figure 6A:
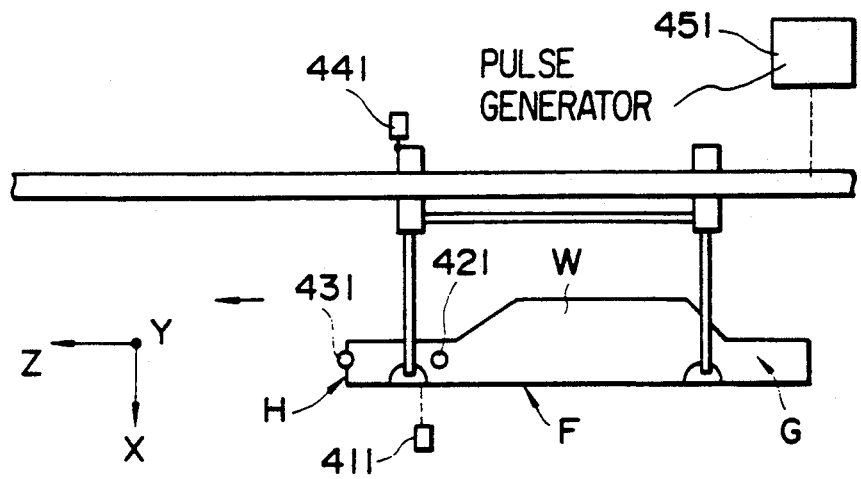
FIGS. 6(a) and 6(b) are a side elevational view and a plan view, respectively, showing conceptually a device according to the present invention for detecting a position of an automobile body.
Figure 6B:
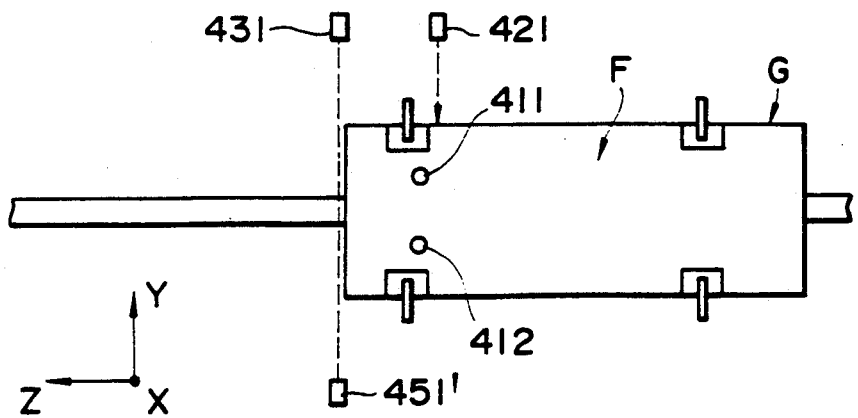

Referring first to FIGS. 6(a) and 6(b), an automobile body W is transported in a direction of the Z axis along which a photoelectric switch 431 is provided at a predetermined location so that it may detect a front face H of the automobile body W.

A distance sensor 421 is also provided for measuring a distance in a direction of the Y axis to a side face G of the automobile body W.

Another pair of distance sensors 411 and 412 are provided for measuring distances in a direction of the X axis to a bottom face F of the automobile body W.

A limit switch 441 for detecting a position of a carrier of the overhead conveyor and a pulse generator 451 for detecting movement of such carrier of the overhead conveyor are also provided.

Figure 8:
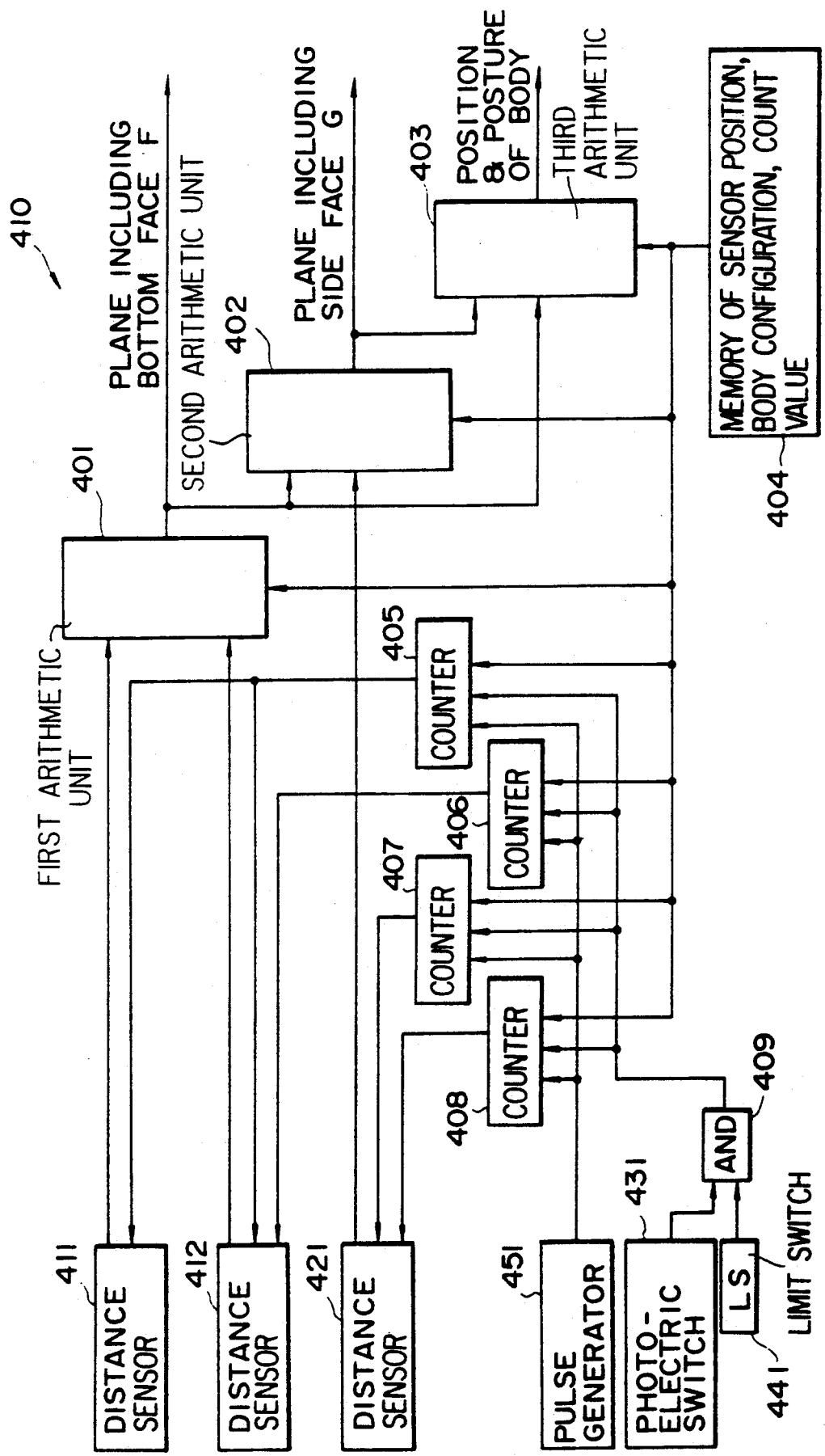
FIG. 8 is a block diagram of the position detecting device for an automobile body shown in FIGS. 6(a), 6(b), 7(a) and 7(b).

In operation, referring also to FIG. 8 which shows the position detecting device 410, when the front face H of an automobile body W is detected by the photoelectric switch 431 and arrival of a carrier of the overhead conveyor is detected by the limit switch 441 (condition shown in FIGS. 6(a) and 6(b)), a count starting signal is delivered from an AND circuit 409 to counters 405, 406, 407 and 408.

In response to such starting signal, the counters 405 to 408 start their operation to count pulses from a pulse generator 451.

When the count value of the counter 405 reaches a first reference value set in advance in a memory for the type of the automobile body W, the distance sensors 411 and 412 are rendered operative to measure distances in a direction of the X axis to the bottom face F of the automobile W.

Figure 7A:
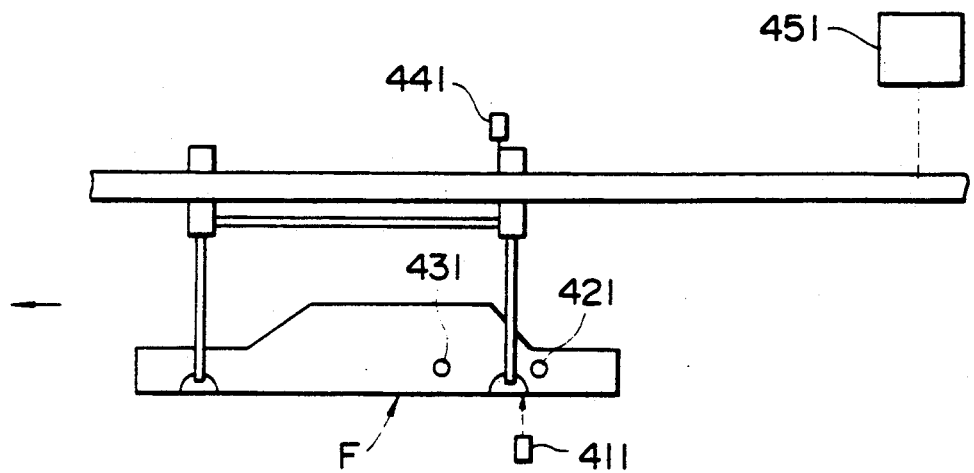
FIGS. 7(a) and 7(b) are views similar to FIGS. 6(a) and 6(b), respectively, but showing a position of the position detecting device of FIGS. 6(a) and 6(b) after a predetermined interval of time in operation.
Figure 7B:
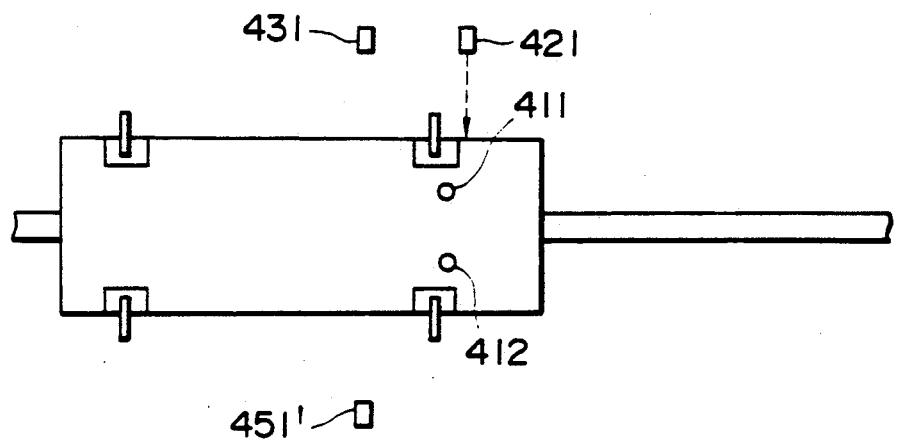

Then, when the counter value of the counter 406 reaches a second reference value greater than the first reference value, the distance sensor 412 is rendered operative to measure a distance in the direction of the X axis to the bottom face F. The condition is shown in FIGS. 7(a) and 7(b).

Thus, the distances in the direction of the X axis to the three points on the bottom face F of the automobile W from the reference points at which the distance sensors 411 and 412 are located are determined, and consequently, spatial coordinates of the three points on the bottom face F are determined. Accordingly, if the spatial coordinate data are converted into data for the position shown in FIGS. 6(a) and 6(b), then a plane which includes the bottom face F in the condition shown in FIGS. 6(a) and 6(b) can be calculated by means of arithmetic unit 401.

Similarly, when the count value of the counter 407 reaches a third reference value, the distance sensor 421 is rendered operative to measure a distance in a direction of the Y axis to a point on the side face G of the automobile W.

Further, when the count value of the counter 408 reaches a fourth reference value, the distance sensor 421 is rendered operative again to measure a distance in the direction of the Y axis to another point on the side face G. The condition is shown in FIGS. 7(a) and 7(b).

From results of such measurement, a plane which includes the side face G of the automobile W in the condition shown in FIGS. 6(a) and 6(b) can be calculated by means of arithmetic unit 402 in a similar manner as described hereinabove.

Thus, since, in the position shown in FIGS. 6(a) and 6(b), part of the front face H of the automobile body W lies in a plane perpendicular to the Z axis and including the photoelectric switch 431, the position of the automobile body W in the position shown in FIGS. 6(a) and 6(b) can be defined perfectly.

A position of the automobile body W at an arbitrary point of time can be calculated by means of the arithmetic unit 403 taking a distance of movement of the automobile body W by the overhead conveyor into consideration as determined by the memory 404 which stores information and data concerning the conveyor position, body configuration and count value.

Having now fully described the invention, it will be apparent to one of ordinary skill in the art that many changes and modifications can be made thereto without departing from the spirit and scope of the invention as set forth herein.

What is claimed as new and desired to be secured by Letters Patent of the United States is:

1. A device for detecting a position of a moving body, comprising:
    a Z position detecting switch means for detecting movement of a body in a space defined by rectangular coordinate axes X, Y and Z, in a direction of the Z axis and for producing a trigger signal upon detecting movement of the body;
    an X distance measuring means for measuring, after lapse of a predetermined interval of time after delivery of the trigger signal from said Z position detecting switch means, distances in a direction of the X axis from known points to two points $f_1$ and $f_2$ on a face F of the body intersecting the direction of the X axis and for measuring, after lapse of another predetermined interval of time thereafter, a distance in the direction of the X axis from one of the known points to another point $f_3$ on the face F;
    a Y distance measuring means for measuring, after lapse of a predetermined interval of time after delivery of the trigger signal from said Z position detecting switch means, a distance in a direction of the Y axis from a known point to a point $g_1$ on a face of the body intersecting the direction of the Y axis and for measuring, after lapse of another predetermined interval of time thereafter, a distance in the direction of the Y axis from the known point to another point $g_2$ on the face G; and
    calculating means for calculating a position of the body in accordance with results and timings of the measurements by said X and Y distance measuring means and predetermined data defining the configuration of the body.

2. An apparatus for detecting a position of a moving body in a space defined by rectangular coordinate axes X, Y and Z, in a direction of the Z axis, comprising:
    a Z position detecting switch means for detecting movement of said moving body and delivering a trigger signal in response to detecting said moving body at a predetermined position;
    an X distance measuring means for measuring, after lapse of a first predetermined interval of time and/or distance after delivery of the trigger signal from said Z position detecting switch means, distances in a direction of the X axis from first and second known points to two respective points $f_1$ and $f_2$ on a face F of the moving body intersecting the direction of the X axis and for measuring, after lapse of a second predetermined interval of time and/or distance, a distance in the direction of the X axis from one of the first or second known points to another point $f_3$ on the face F;
    a Y distance measuring means for measuring, after lapse of a third predetermined interval of time and/or distance after delivery of the trigger signal from said Z position detecting switch means, a distance in a direction of the Y axis from a third known point to a point $g_1$ on a face G of the moving body intersecting the direction of the Y axis and for measuring, after lapse of a fourth predetermined interval of time and/or distance, a distance in the direction of the Y axis from the third known point to another point $g_2$ on the face G; and
    a calculating means for calculating a position of the moving body in accordance with results and timings of the measurements by said X and Y distance measuring means and data of a configuration of the moving body.

3. A method for detecting a position of a moving body in a space defined by rectangular coordinate axes X, Y and Z, in a direction of the Z axis, comprising the steps of:
    detecting movement of said moving body to deliver a trigger signal to a Z position detecting switch means in response to detecting said moving body at a predetermined position;
    measuring, after lapse of a first predetermined interval of time and/or distance after delivery of the trigger signal from said Z position detecting switch means, distances in a direction of the X axis from first and second known points to two points respective $f_1$ and $f_2$ on a face F of the moving body intersecting the direction of the X axis and measuring, after lapse of a second predetermined interval of time and/or distance, a distance in the direction of the X axis from one of the first or second known points to another point $f_3$ on the face F;
    measuring, after lapse of a third predetermined interval of time and/or distance after delivery of the trigger signal from said Z position detecting switch means, a distance in a direction of the Y axis from a third known point to a point $g_1$ on a face G of the moving body intersecting the direction of the Y axis and for measuring, after lapse of a fourth predetermined interval of time and/or distance, a distance in the direction of the Y axis from the third known point to another point $g_2$ on the face G; and
    calculating a position of the moving body in accordance with results and timings of the measurements by said X and Y distance measuring means and data of a configuration of the moving body.

* * * * *